(12) United States Patent
Girodet

(10) Patent No.: US 7,317,193 B2
(45) Date of Patent: Jan. 8, 2008

(54) ULTRAVIOLET RADIATION WATER DISINFECTING DEVICE

(75) Inventor: Pierre Girodet, Asnieres-sur-Seine (FR)

(73) Assignee: OTV SA (FR)

( * ) Notice: Subject to any disclaimer, the term of this patent is extended or adjusted under 35 U.S.C. 154(b) by 305 days.

(21) Appl. No.: 10/551,163

(22) PCT Filed: Mar. 25, 2004

(86) PCT No.: PCT/FR2004/000756

§ 371 (c)(1),
(2), (4) Date: Sep. 27, 2005

(87) PCT Pub. No.: WO2004/085317

PCT Pub. Date: Oct. 7, 2004

(65) Prior Publication Data

US 2006/0192135 A1    Aug. 31, 2006

(30) Foreign Application Priority Data

Mar. 27, 2003 (FR) .................................. 03 03808

(51) Int. Cl.
*B01D 17/06* (2006.01)
*G01N 21/33* (2006.01)

(52) U.S. Cl. .................... 250/455.11; 250/453.11; 250/435; 250/437

(58) Field of Classification Search ........... 250/455.11, 250/453.11, 435
See application file for complete search history.

(56) References Cited

U.S. PATENT DOCUMENTS

| | | | |
|---|---|---|---|
| 5,019,256 A * | 5/1991 | Ifill et al. ................... 210/232 |
| 5,952,663 A * | 9/1999 | Blatchley et al. ........... 250/435 |
| 6,126,841 A * | 10/2000 | Whitby et al. .............. 210/748 |
| 6,231,820 B1 * | 5/2001 | Wedekamp ............... 422/186.3 |
| 6,803,586 B1 * | 10/2004 | Brunet et al. ................ 250/434 |
| 6,984,834 B2 * | 1/2006 | Alexander et al. ........ 250/493.1 |
| 7,160,566 B2 * | 1/2007 | Fink et al. ................... 426/235 |
| 2002/0113021 A1 * | 8/2002 | Traubenberg et al. ....... 210/748 |
| 2004/0211926 A1 * | 10/2004 | Alexander et al. ........ 250/493.1 |
| 2005/0232825 A1 * | 10/2005 | Fowler et al. .............. 422/121 |
| 2005/0263716 A1 * | 12/2005 | From et al. ............ 250/453.11 |
| 2006/0091326 A1 * | 5/2006 | Traubenberg et al. .... 250/497.1 |
| 2006/0222576 A1 * | 10/2006 | Rudkowski et al. ..... 422/186.3 |

FOREIGN PATENT DOCUMENTS

| | | |
|---|---|---|
| DE | 199 57 073 | 11/1999 |
| WO | WO 02/30827 | 4/2002 |
| WO | WO 02/072480 | 9/2002 |

OTHER PUBLICATIONS

Loge, Frank J., Emerick, Robert W., Heath, Mark, Jacangelo, Joseph, Tchobanoglous, George, Darby, Jeannie L., "Ultraviolet disinfection of secondary wastewater effluents: prediction of performance and design," *Water Environment Research*, vol. 68, No. 5, pp. 900-916.

* cited by examiner

*Primary Examiner*—Jack I. Berman
*Assistant Examiner*—Johnnie L Smith, II
(74) *Attorney, Agent, or Firm*—Coats & Bennett, P.L.L.C.

(57) ABSTRACT

An ultraviolet water treatment system is provided for treating water moving through a treatment area in a direction D. The system includes a series of ultraviolet modules disposed in side-by-side relationship in the treatment area. Each module includes an ultraviolet lamp and a pair of vertical supports with one support of each module being deemed an upstream support and one support being deemed a downstream support. The upstream supports of the respective modules are non-aligned and at least two of the upstream supports are staggered in the direction D and lie generally in separate transverse planes with respect to direction D.

11 Claims, 3 Drawing Sheets

ULTRAVIOLET RADIATION WATER DISINFECTING DEVICE

This application is a U.S. National Stage application of PCT Application No. PCT/FR04/00756, with an international filing date of Mar. 25, 2004. Applicant claims priority based on French application serial no. 03 03808 filed Mar. 27, 2003.

The invention relates to the domain of water treatment for disinfection purposes, both for purification processes and for drinking water treatment processes.

More precisely, the invention relates to disinfection of water by ultraviolet radiation in an open channel.

With this technique, the water to be disinfected passes through the upper part of an open channel inside which one or several banks of lamps are arranged applying ultraviolet radiation at a wavelength between 200 nm and 300 nm, and usually 254 nm, these banks being organised in vertical modules parallel to each other, each module being composed of one or several vertical series of UV lamps protected by quartz claddings arranged in the flow direction of the water to be disinfected in the channel.

These UV lamp banks are arranged in the channel such that all lamps are immersed in water passing through the channel. Each module is held in position by a beam provided with supports holding lamps in their cladding transparent to UV rays. The lamps are usually arranged such that their longitudinal axis is essentially parallel to the direction of water flow in the channel. The water disinfection channels are thus equipped with several banks of lamps arranged in the channel one after the other.

This ultraviolet radiation disinfection technique in an open channel has existed for about 20 years. The power of UV lamps has been increasing as the technique evolved, particularly due to the technology of low pressure UV lamps, by which each lamp bank can treat an increasingly larger quantity of water.

One of the disadvantages of this technique lies in the fact that there is a head loss during the passage of the water in the channel, at the location at which water comes into contact with the lamp banks. As the technology of UV lamps has improved, this head loss has become a factor limiting the global efficiency of this type of technology.

Two types of solutions have been proposed in the past to reduce this head loss observed in water as it passes through UV disinfection channels.

A first solution consisted of profiling supports of UV lamps as to improve the water flow.

Another solution consisted of designing the connectors so that they have a low hydraulic resistance while incorporating lamp attachment means onto supports inside the quartz claddings protecting the lamps and to combine these means with supports with a very lightweight structure.

These solutions have the disadvantage that they are relatively expensive.

Furthermore, they do not enable the lamps to be brought to an optimum distance, which can penalise the global efficiency of each bank.

The spacing of the lamps is fundamentally important towards the global efficiency of the reactor.

In particular, when dirty water is being treated, the transmission of ultraviolet radiation is low. In practice, this transmission may be reduced by 50% in a 1 cm thick water stream due to the high concentration of this type of effluent. Consequently, the shorter the distance between UV reactor lamps, the more efficient they will be, particularly for water with low UV transmission. However, as the distance between these UV lamps reduces, the space available inside the banks through which water can pass becomes smaller and therefore the pressure loss becomes higher.

A head loss of a few centimetres may have catastrophic consequences on the global efficiency of a UV installation composed of several banks. In practice, if this pressure loss becomes too high, the water level at the first bank can increase and therefore poorly treated bacteria can concentrate on the surface.

At the same time, the upper lamps in the next banks along the water flow direction may be not always by submersed. But immersing the lamps can be very harmful because it causes overheating of the lamps and considerably shortens their live.

Therefore, it can be understood that this head loss problem is particularly important.

One purpose of this invention is to present a simple solution that can partly solve this head loss problem observed in conventional water disinfection installations by UV radiation in an open channel.

In particular, one purpose of this invention is to propose such a technical solution that does not involve basic modifications to the design of disinfection modules formed as described above by superposing several UV lamps protected by quartz claddings in vertical rows.

These objectives are achieved by the invention that relates to a water disinfection device by ultraviolet radiation designed to be installed in an open channel in a water disinfection installation by ultraviolet radiation in which the water to be disinfected flows along a direction D, the said device including a plurality of longitudinal means forming UV lamps each consisting of a UV lamp, a protective cladding made from a material transparent to UV rays, and connectors arranged essentially longitudinally along the said direction D and being distributed in a plurality of vertical modules, each module being composed of a beam to which means forming upstream and downstream vertical supports are fixed holding at least one vertical series of the said means forming lamps located under the said beam one above the other, characterised in that the said means forming upstream supports are mounted in n planes essentially perpendicular to the said direction D, where n is more than 1.

Note that in the context of this invention, the terms "upstream" and "downstream" are defined with respect to the water flow along the direction D in the installation channel.

Although the upstream support means could be offset without a corresponding offset in the means forming lamps, the upstream ends of these means forming lamps will preferably also be located in p planes where p is greater than or equal to n.

Therefore according to this invention, the means forming upstream supports are not all in the same plane perpendicular to the water flow direction in the channel. Thus, this water does not encounter all the upstream support means and consequently all means forming lamps, at the same time, but encounters some of them first and then at least another part of them. Thus, the head loss observed by the water at the time that it comes into contact with the disinfection device is very much reduced.

It will be noted that the invention covers all layouts of means forming an upstream support for lamps according to which these upstream supports are provided in several planes rather than in a single plane, therefore the number of planes n could then be 2 or 3 or even more.

Thus according to the invention, the means forming an upstream support are offset from each other, which can slow down the water when it comes into contact with the modules making up the disinfection device.

Furthermore, note that if the means forming the upstream support of the means forming the lamps of the device are offset from each other according to this invention, the upstream ends of lamps included in the means forming lamps are preferably located in a single upstream plane and the downstream ends are located in a single downstream plane. Thus, the useful area of these means forming lamps formed by areas in which the radiations from the different lamps are combined, is not reduced. According to one such characteristic, for the means forming lamps, the claddings made from the material transparent to ultraviolet radiation protecting the lamps have to be made longer than they would be according to the state of the art, although the lamps themselves remain the same length.

As already mentioned, it would be possible that the number of planes n in which the means forming the upstream support are arranged would be 2 or 3 or more. Similarly, the number of planes p in which the ends of the means forming the lamps are arranged could be equal to 2 or 3 or more. However, according to one preferred variant, the number of planes n will be equal to 2 and the number of planes p will also be equal to 2.

It would also be possible to have different distances in these two offset planes, depending on their embodiment. However, according to one preferred variant, this distance δ will be between about 5 and about 30 cm.

Note also that if the means forming an upstream support according to this invention are located in at least two different planes, the means forming the downstream support could be located in a single or in different planes. However, according to one preferred embodiment, when the means forming the upstream support are provided in n planes, the means forming the downstream support are also provided in n planes.

This invention gives better water flow in the disinfection device than is possible with prior art. Due to this better flow, the distance separating the means forming the lamps can be reduced, to obtain an equally efficient disinfection. In practice, the c/c distance between the axes of the different means forming lamps could be between about 6 and 15 cm.

At the same time, it would also be possible to provide the means forming lamps with large diameter protective claddings so as to reduce the water stream passing between them. In practice, the diameter of these claddings according to this invention could be between about 2 and 6 cm.

Although the beams in the different modules could have upstream ends in different planes and downstream ends in different planes, these beams would preferably have upstream ends provided in the same plane transverse to the water flow direction in the channel and downstream ends provided in the same plane transverse to the water flow direction in the channel.

The invention also covers any water disinfection installation by ultraviolet radiation comprising an open channel in which the water to be disinfected flows along a direction D characterised in that it includes at least one device like that described above.

The invention and the different advantages that it has will be more easily understood after reading the description given below of a non-limitative embodiment of it given with reference to the drawings in which.

Figure 1:
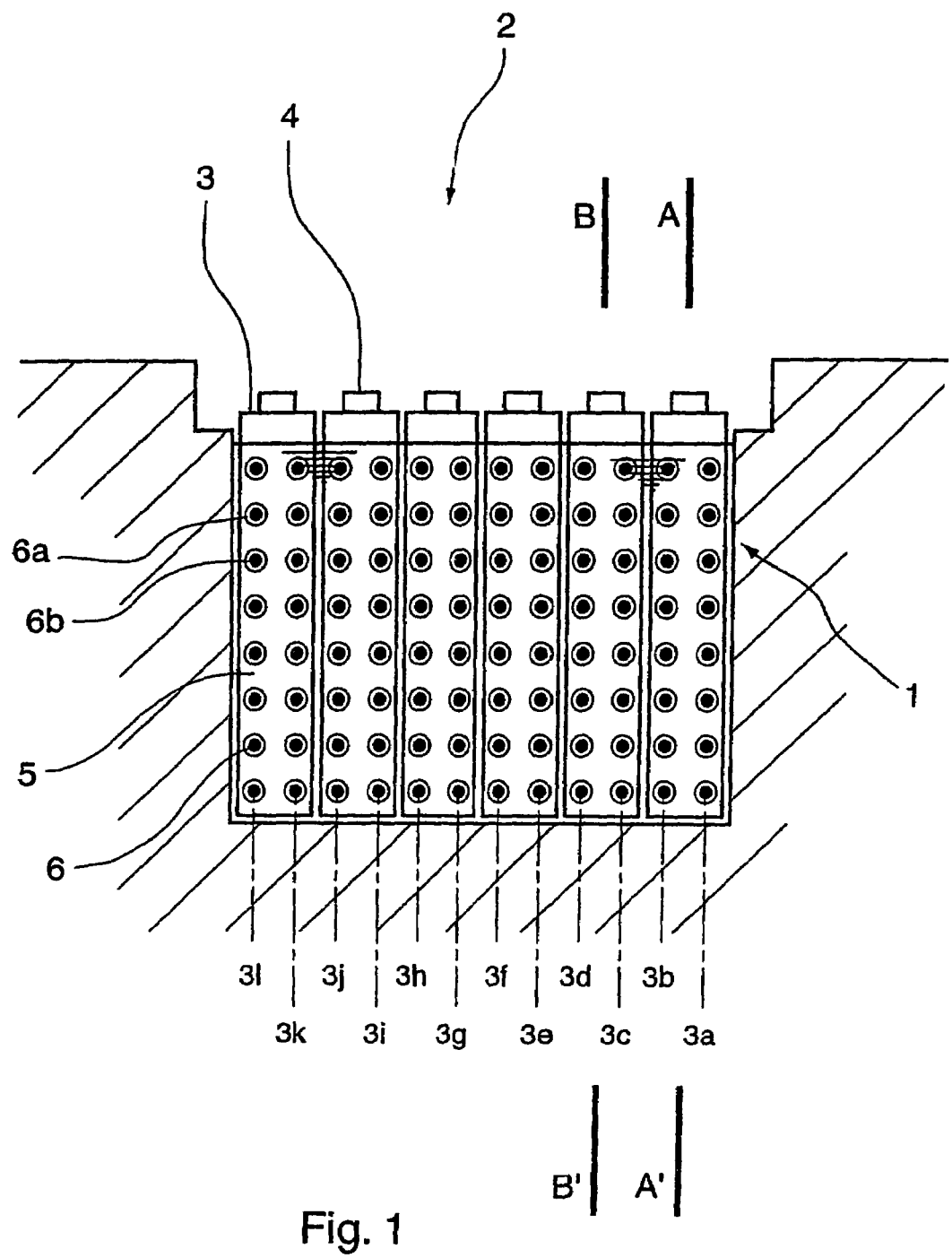
FIG. 1 shows a cross-sectional view of an installation at a disinfection device according to this invention.

With reference to FIG. 1, a water disinfection installation comprises a concrete channel 1 (or a channel made from any other material, for example stainless steel) open at its top and in which water to be disinfected flows.

A water disinfection device according to this invention is installed in channel 1 in order to disinfect water passing in this channel.

For the purposes of this invention, this device 2 is composed of an association of six disinfection modules 3 arranged parallel to each other. Those skilled in the art conventionally refer to this association of disinfection modules using the term "bank".

Each module is composed of a beam 4 to which supports 5 (2 supports per beam) are connected, accompanying two vertical series of means forming lamps 6.

In the context of this non-limitative example embodiment, the length of the lamps is approximately 150 cm and their power is 130 WUVC (watts UVC, where UVCs are UVs with a wavelength of between 200 and 300 nm).

The c/c distance between the means forming lamps is 9 cm and the diameter of the claddings protecting the lamps is 3.5 cm.

Figures 2, 3, 4:
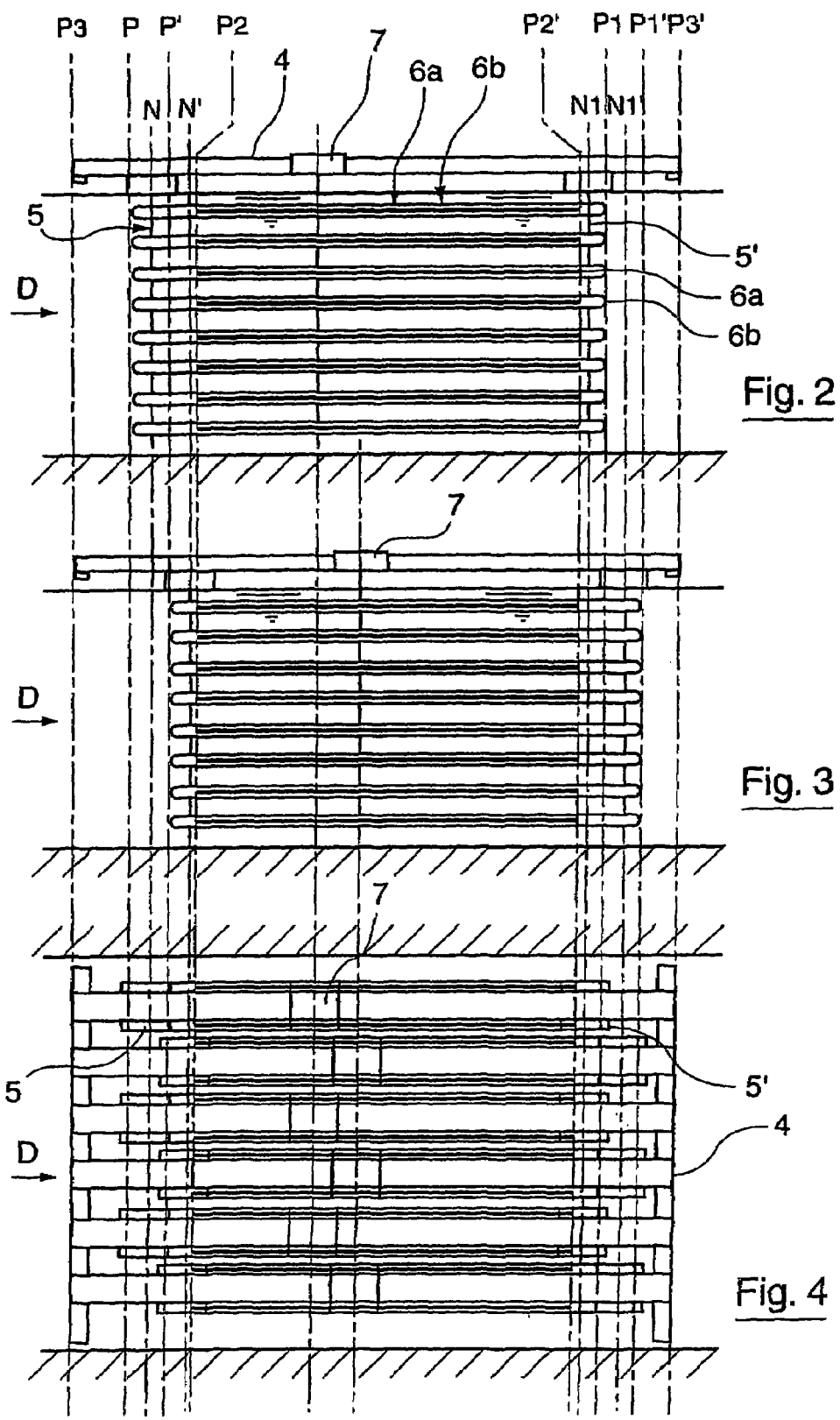
FIG. 2 shows a longitudinal sectional view AA' of the installation according to FIG. 1.
FIG. 3 shows a longitudinal sectional view BB' of the installation according to FIG. 1.
FIG. 4 shows a top view of the installation shown in FIG. 1.

The installation that is shown in a downstream cross-section in FIG. 1, is represented in a longitudinal section in FIG. 2 and in FIG. 3. The arrows D define the water flow direction in the channel in these figures.

FIG. 2 is a sectional view of the installation along plane AA' in FIG. 1, while FIG. 3 is a sectional view of the installation along plane BB' in FIG. 1.

FIGS. 2 and 3 show a side view of a module 3, this module including a horizontal beam 4 connected to two vertical supports 5, namely 5, 5' holding the means forming a UV lamp 6. According to the state of the art, these means forming UV lamps 6 are each composed of a lamp 6a emitting ultraviolet radiation protected by a cladding 6b made from a material transparent to ultraviolet radiation, in this case quartz and connectors (not shown for reasons of clarity in the figure) at one of the ends of the lamp.

Conventionally, each module 3 also comprises scraping means 7 installed sliding on the beam 4 and on the means forming lamps 6 of this module along a movement distance corresponding to the length of the lamps 6a. Scraping means 7 of this type can be used periodically to clean the claddings of the means forming the lamp 6 and eliminate impurities that could reduce diffusion of the UV radiation emitted by the lamps contained in these claddings.

According to this invention, the means forming an upstream support 5 of the module shown in FIG. 2 are provided in a plane N different from plane N' containing the means forming the upstream support of the module represented in FIG. 3. As a result, the upstream ends of the means forming lamps 6 of the module shown in FIG. 2 are in a plane P different from the plane P' in which the upstream ends of the means forming lamps 6 in the module shown in FIG. 3 are located.

Within the context of this embodiment, the distance δ between planes N and N' is 15 cm.

The means forming the upstream support 5 of the different modules forming the bank 2 are provided alternately in plane N and in plane N'.

More precisely, with reference to FIG. 1, the vertical rows of lamps 3a, 3b, 3e, 3f, 3i, 3j present means forming an upstream support provided in plane N, while the vertical rows of lamps 3c, 3d, 3g, 3h, 3k and 3l present means forming an upstream support provided in plane N'.

In this way, the head loss in the water passing through the channel is lower due to the offset in the position of the means forming an upstream support with respect to each other.

The means forming an upstream support 5' are also provided in the offset planes N1 and N1'.

Note that all means forming lamps 6 are the same length in all modules. Consequently, their downstream ends are also located in planes offset from each other P1 and P1' as can be seen in FIGS. 2 and 3.

However, in order to optimise the efficiency of the means forming lamps 6, all lamps 6a are the same length and all are parallel to each other over their entire length. Therefore, their upstream ends are in the same plane P2 and downstream ends are in the same plane p2'. Consequently, the means forming lamps 6 have a non-symmetrical construction, since the distances between the ends of the lamp and the ends of the quartz cladding that protects them are not the same at the upstream and downstream ends.

As can be seen in FIGS. 2, 3 and 4, the upstream ends and the downstream ends of the beams 4 of the different lamp modules 6 are in the same planes P3 and P3'.

The installation described above has been used to disinfect water.

An installation according to the state of the art with means forming non-offset lamps with exactly the same power as the installation shown in FIGS. 1 to 4 was tested with the same water.

Head losses (PdC) observed with the installation according to this invention and with the installation according to state of the art were measured by subtracting the height h2 of the water level with respect to a reference on the downstream side of the module (PdC=h1−h2), from the height h1 of the water level with respect to this same reference on the upstream side of the module. These measurements were made in both cases (invention and prior art) using constant input water flows to installations (172.5 m³/h and 180 m³/h) and then using variable flows. Several measurements were made for each installation at different times.

The results are given in tables 1 to 6 below.

Table 1 relates to the results obtained with the installation according to prior art, in other words without any offset in the means forming the support with a constant flow of 172.5 m³/h.

TABLE 1

| Measurement No. | Q (m3/h) | h1 (cm) | h2 (cm) | PdC (cm) |
| --- | --- | --- | --- | --- |
| 1 | 172.5 | 1.3 | 3.3 | 2 |
| 2 | 172.5 | 0.7 | 3.5 | 2.8 |
| 3 | 172.5 | 1 | 3.3 | 2.3 |
| 4 | 172.5 | 1.5 | 3.7 | 2.2 |
| 5 | 172.5 | 1.3 | 3.5 | 2.2 |
| 6 | 172.5 | 0.7 | 3.5 | 2.8 |
| 7 | 172.5 | 1.1 | 3.3 | 2.2 |
| 8 | 172.5 | 0.9 | 3.4 | 2.5 |
| 9 | 172.5 | 1 | 3.5 | 2.5 |
| Average | 172.5 | 1.05 | 3.44 | 2.39 |
| Standard deviation | 0 | 0.27 | 0.13 | 0.28 |

On average, out of the 9 readings made, the observed head loss is 2.39 cm+/−0.28 cm.

Table 2 relates to the results obtained with the installation according to the invention, in other words showing an offset of the means forming the support, also at a constant flow of 172.5 m³/h.

On average, out of the 8 readings made, the observed head loss is 1.62 cm+/−0.30 cm, which is 47% better than in prior art.

TABLE 2

| Measurement No. | Q (m3/h) | h1 (cm) | h2 (cm) | PdC (cm) |
| --- | --- | --- | --- | --- |
| 1 | 173 | 1 | 3 | 2 |
| 2 | 172 | 1.5 | 3 | 1.5 |
| 3 | 172.5 | 1.7 | 3 | 1.3 |
| 4 | 172.5 | 2 | 3.2 | 1.2 |
| 5 | 172.5 | 1.5 | 3 | 1.5 |
| 6 | 172.5 | 1.5 | 3.5 | 2 |
| 7 | 172.5 | 1.7 | 3.5 | 1.8 |
| 8 | 172.5 | 1.5 | 3.2 | 1.7 |
| Average | 172.5 | 1.55 | 3.17 | 1.62 |
| Standard deviation | 0.25 | 0.28 | 0.22 | 0.30 |

The installation according to the invention was also tested with a water flow of 180 m³/h. The observed head loss results are shown in Table 3 given below.

TABLE 3

| Measurement No. | Q (m3/h) | h1 (cm) | h2 (cm) | PdC (cm) |
| --- | --- | --- | --- | --- |
| 1 | 180 | 0.5 | 1.7 | 1.2 |
| 2 | 180 | 0.5 | 1.7 | 1.2 |
| 3 | 180 | 0.7 | 1.7 | 1 |
| 4 | 180 | 0.5 | 1.5 | 1 |
| 5 | 180 | 0.3 | 1.5 | 1.2 |
| 6 | 180 | 0.5 | 1.7 | 1.2 |
| 7 | 180 | 0.5 | 1.8 | 1.3 |
| Average | 180 | 0.5 | 1.66 | 1.16 |
| Standard deviation | 0 | 0.11 | 0.11 | 0.11 |

On average, out of the 7 readings made, the observed head loss is 1.16 cm+/−0.11 cm.

The installation according to prior art and the installation according to the invention were also tested at variable input flows Q.

Tables 4 and 5 indicate head losses observed with the installation according to prior art (modules not offset) and according to the invention (modules offset) respectively, with variable input flows. The water level on the downstream side of the installation was allowed to vary during these tests.

TABLE 4

| Q(m3/h) | Head loss (cm) |
| --- | --- |
| 171 | 3 |
| 191.8 | 3.5 |
| 220 | 4.1 |
| 247 | 4.3 |
| 275 | 5.2 |
| 171 | 3.1 |
| 159 | 2.5 |
| 138.5 | 2.3 |
| 100 | 1.5 |
| 82 | 1.3 |
| 190 | 3.5 |
| 295 | 5.35 |

TABLE 5

| Q(m³/h) | Head loss (cm) |
| --- | --- |
| 171 | 3.9 |
| 189 | 4.5 |
| 219 | 4.7 |
| 247 | 5.16 |
| 275 | 5.3 |
| 157 | 3.5 |
| 135 | 2.8 |
| 106 | 2.2 |

Figure 5:
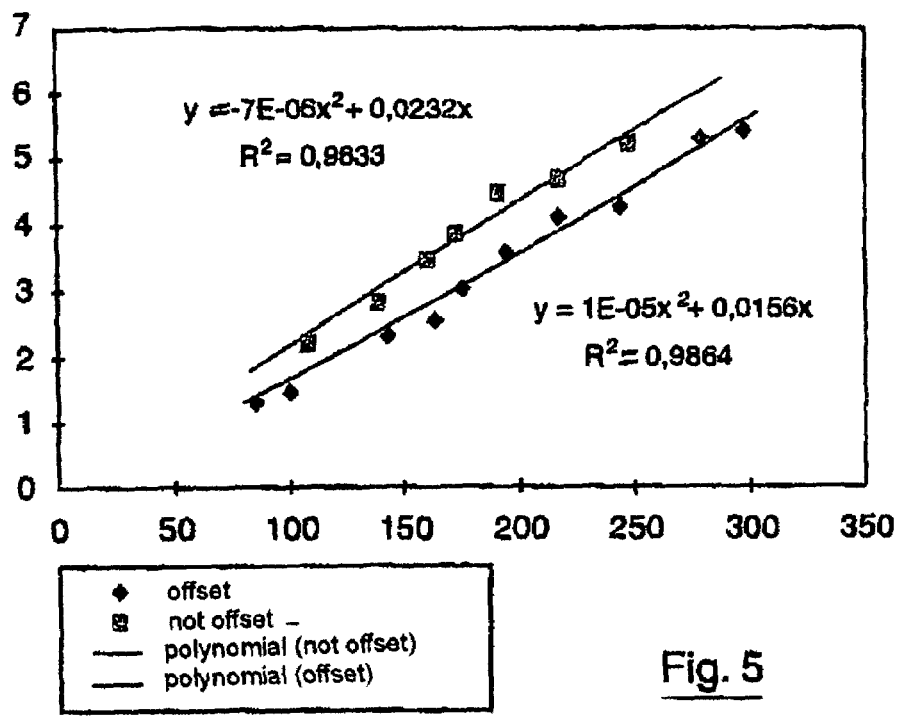
FIGS. 5 and 6 show graphs of head losses observed with an installation according to prior art and with the installation according to FIGS. 1 to 4.

The data according to Tables 4 and 5 are shown on the graphs in FIG. 5. A polynomial interpolation of these data was carried out and clearly displays the advantages of the invention, in the form of curves. The curve representative of data collected during an application of this invention is clearly below the curve representative of data collected with the installation according to prior art, showing a significant reduction in the head loss.

Tables 6 and 7 indicate head losses observed with the installation according to prior art (modules not offset) and according to the invention (modules offset) respectively, with variable input flows. The water level on the downstream side of the installations was kept approximately constant during these tests.

TABLE 6

| Q(m³/h) | Head loss (cm) |
| --- | --- |
| 104 | 2 |
| 132 | 2.2 |
| 158 | 3 |
| 170 | 3.5 |
| 190 | 4 |
| 220 | 4.9 |
| 249 | 5.4 |
| 276 | 6.5 |
| 295 | 6 |

TABLE 7

| Q(m³/h) | Head loss (cm) |
| --- | --- |
| 133 | 2 |
| 148.8 | 2.5 |
| 161 | 2.6 |
| 169 | 2.7 |
| 173 | 2.8 |
| 190 | 3.3 |
| 194 | 3.5 |
| 220 | 4.3 |
| 220 | 3.8 |
| 249 | 4.5 |
| 273 | 5.3 |
| 277 | 4.6 |

Figure 6:
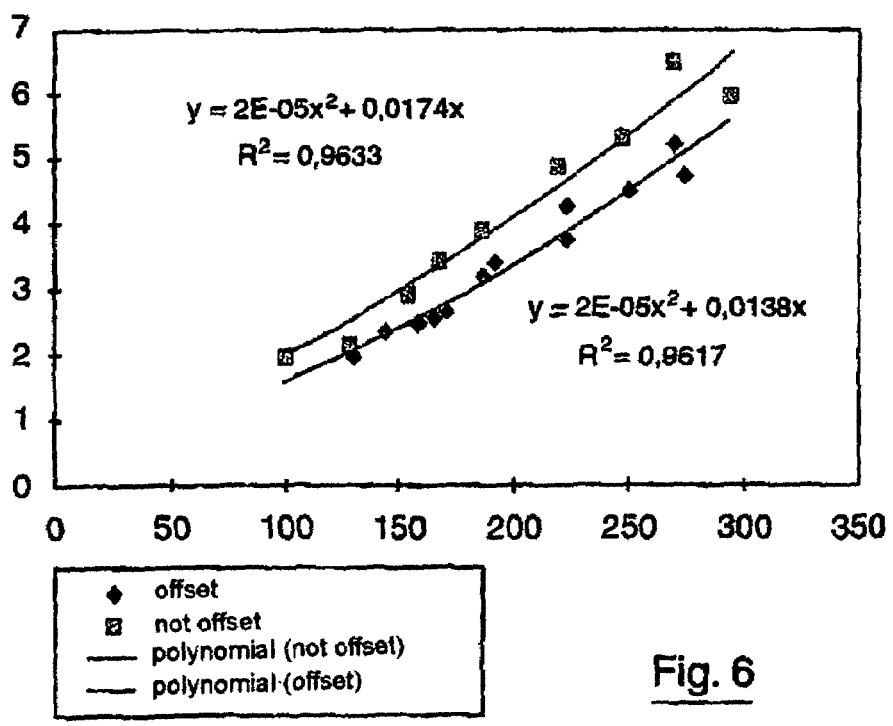

The data according to Table 6 and 7 are shown on graphs in FIG. 6. A polynomial interpolation of these data was also carried out, and this also shows the advantage provided by the invention.

Finally, it will be noted that this invention also improves the germicide efficiency of the installation by making the distribution of the dose received by the micro-organisms even more uniform.

The invention claimed is:

1. An ultraviolet water treatment system for treating water moving through a treatment area in a direction D, comprising:
a series of ultraviolet modules disposed in side-by-side relationship in the treatment area;
each module including one or more ultraviolet lamps, and a pair of vertical supports including an upstream support and a downstream support that supports the one or more UV lamps of each module; and
wherein the upstream vertical support of the respective modules are non-aligned and wherein at least two of the upstream supports are staggered in the direction D.

2. The ultraviolet water treatment system of claim 1 wherein at least two of the upstream vertical supports lie in separate planes that extend transverse with respect to direction D.

3. The ultraviolet water treatment system of claim 1 wherein each module includes a beam that extends in the general direction D and wherein the upstream and downstream vertical support of each module is secured to the beam.

4. The ultraviolet water treatment system of claim 1 wherein the respective ultraviolet lamps include upstream ends and wherein the upstream ends of the ultraviolet lamps are disposed in at least two separate planes that extend generally perpendicular to the direction D.

5. The ultraviolet water treatment system of claim 1 wherein each ultraviolet lamp includes a lamp and a cladding and wherein each lamp includes upstream and downstream ends and wherein the upstream ends of the lamps are located in generally the same plane, and wherein the downstream ends of the lamps are located generally in the same plane.

6. The ultraviolet water treatment system of claim 2 wherein the two planes are separated from each other by a distance of approximately 5 cm to about 30 cm.

7. The ultraviolet water treatment system of claim 1 wherein substantially all of the ultraviolet lamps disposed in the module are of generally the same length.

8. The ultraviolet water treatment system of claim 5 wherein the lamps are spaced apart approximately 6-15 cm.

9. The ultraviolet water treatment system of claim 5 wherein the cladding is made from a material transparent to UV rays and has a diameter of approximately 2-6 cm.

10. The ultraviolet water treatment system of claim 3 wherein the beams of the module all have substantially the same length and have upstream ends located in a single upstream traverse plane and downstream ends located in a single downstream transverse plane.

11. A method of installing an ultraviolet water treatment system in a treatment area where the water to be treated flows through the treatment area in a direction D, comprising: placing a plurality of ultraviolet modules in the treatment area with each ultraviolet treatment module including one or more ultraviolet lamps that extend in the general direction of D and upstream and downstream vertical supports that support the one or more ultraviolet lamps in each module; and staggering at least two of the upstream vertical supports in the direction of D such that at least two of the vertical supports lie in separate planes that extend transverse to direction D.

* * * * *